United States Patent [19]

Voglesonger

[11] 4,087,053

[45] May 2, 1978

[54] LIQUEFIER-COMMINUTER

[75] Inventor: Harry M. Voglesonger, Riverton, Conn.

[73] Assignee: Dynamics Corporation of America, Greenwich, Conn.

[21] Appl. No.: 761,474

[22] Filed: Jan. 24, 1977

[51] Int. Cl.² .............................................. B02C 18/12
[52] U.S. Cl. ................................................ 241/282.1
[58] Field of Search ................ 241/199.12, 277, 282.1, 241/282.2; 259/107, 108, DIG. 25, DIG. 26

[56] References Cited

U.S. PATENT DOCUMENTS

| | | | |
|---|---|---|---|
| 2,284,155 | 5/1942 | Landgraf | 241/199.12 X |
| 2,304,476 | 12/1942 | Poplawski | 241/282.1 UX |
| 2,309,347 | 1/1943 | Landgraf | 241/282.1 |
| 2,733,052 | 1/1956 | Luther | 259/DIG. 25 |
| 3,240,246 | 3/1966 | Dewenter | 241/277 X |
| 3,548,280 | 12/1970 | Cockroft | 259/108 X |

Primary Examiner—Roy Lake
Assistant Examiner—Howard N. Goldberg
Attorney, Agent, or Firm—Watson D. Harbaugh

[57] ABSTRACT

A mixer-liquefier including a container that is readily assembled and cleaned by the user for accelerated performance and cleanliness in handling different quantities of liquids and solids with improved uniformity of results by maintaining a constant path and rate of flow of ingredients through a comminuting zone for a determined interval of time.

10 Claims, 5 Drawing Figures

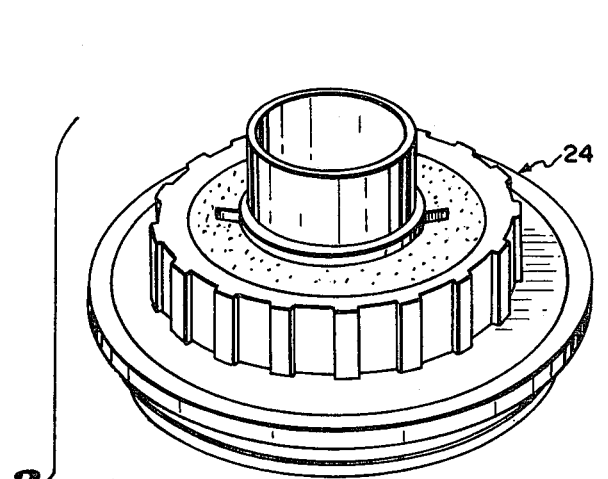
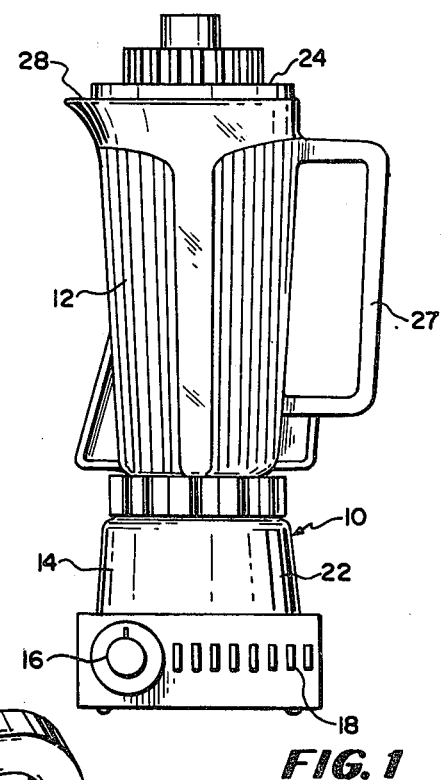
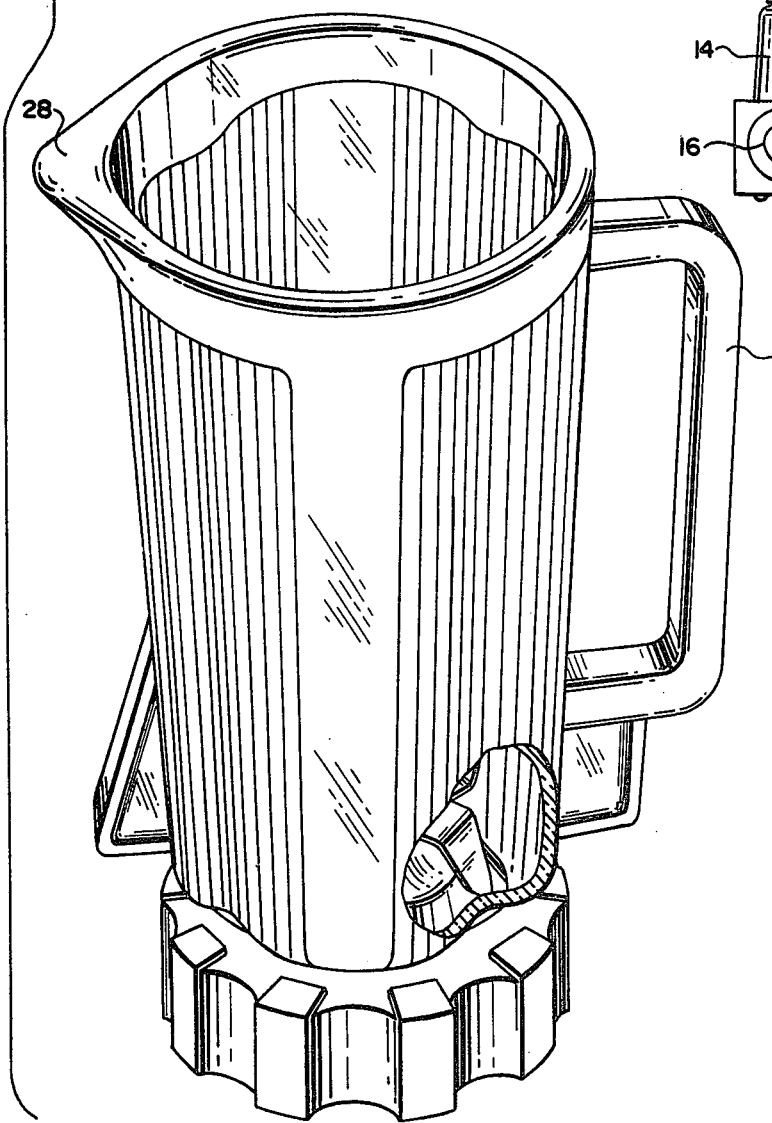

LIQUEFIER-COMMINUTER

BACKGROUND OF THE INVENTION

Although the principle of operation and the basic structural features of the Osius U.S. Pat. No. 2,109,501 liquefier have prevailed as a matter of design for many years, a particular size of load is generally required each operation for uniform results (with liquefiers) if the cycle of operation is recipe-time-set for particular mixtures having solid particles in them to be comminuted. Also, removable bases on jars, as suggested by Forss U.S. Pat. No. 2,530,455, provide a generally acceptable practice for cleanliness of walls and cutters each use when comminuting mixture ingredients. Also, a timer is expected to assure uniform results. However, with both of these concepts combined with a push button timer or speed selector control in conventional liquefiers, or both, the particular load size and the particular recipe ingredients called for appear to be required each time to assure uniform results.

This appears to have become an expectation or conclusion of many users since discrepancies noted in timed mixes of different volumes appear to occur with variation in load sizes. With larger quantities the solid or fibrous ingredients conventionally are not being processed completely as they pass through the cutters. With smaller volumes, overcomminution can occur. However, acceptable uniformity of results in a timed interval is not dependent upon uniformity of load size or materials, but rather, the thoroughness of the circulation through constant speed cutters as distinguished from around them.

Heretofore, the pedestals in the bottom of conventional liquidizer containers supporting the rotatable cutter are of substantial height to provide appreciable space around and below the cutter blades to accommodate solids in a mixture and for centrifugation and circulation and theoretically upwardly along the container walls. Any solids tending to collect below the cutter blades are intentionally forced to flow in a path radially outwardly and upwardly along the container walls. Unfortunately, this essentially avoids, by flowing around, intimate or repeated contact with the cutters. This is particularly true where flutes in the container walls extend a substantial distance below the cutters as illustrated in Osius U.S. Pat. No. 2,109,501 or Corcoran U.S. Pat. No. 2,788,038. It is in this region that comminution of solids may correspondingly be slowed down with an increase in the amount of solids involved.

Thus, with the present-day push button or timer switch determining the duration of each period of comminution in a liquefying container, the uniformity of the mixture can be said to vary quite measurably and objectionably with variations in the quantity of solids present. The desired or expected homogeneity or comminution may not be attained in the time period prescribed by a recipe when the amount of solids varies under these conditions. There are differentials in conventional circulation contact of solids by the cutters accompanying quantum changes in either solids or liquids for the same period of time.

IN THE DRAWINGS

FIG. 1 is a side-elevational view of a liquefier embodying the invention;

FIG. 2 is an exploded perspective view of the liquefier jar embodying the invention;

DESCRIPTION OF PREFERRED EMBODIMENT

Figure 3:
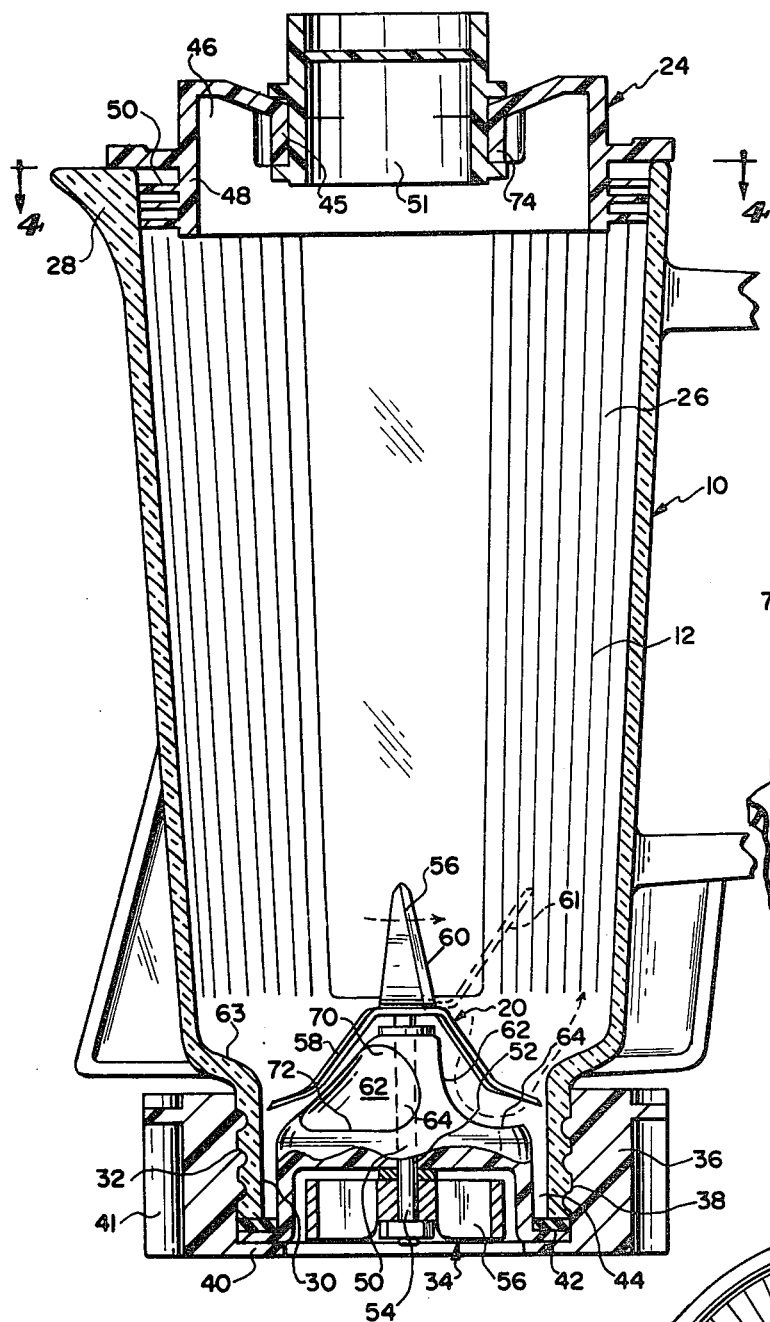
FIG. 3 is a vertical sectional view of the assembled jar.
Figure 5:
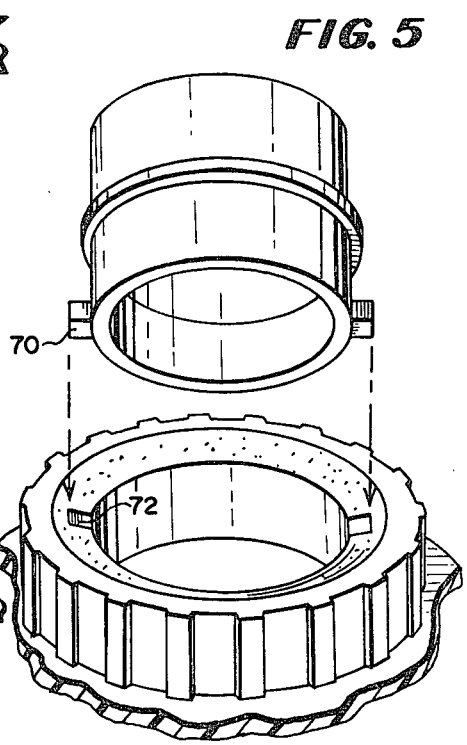
FIG. 5 is a perspective view of the disassembled cover.

The liquefier 10 embodying the invention comprises a container or jar 12 removably mounted coaxially with a conventional power unit 14 having a timer selector 16 to control a universal motor for a selected period of time at any one of a number of fixed speeds or alternatively by a push button 18 (FIG. 1) to start a predetermined period of time. A selected motor speed varies but very little with volume changes involving the same ingredients substantially within the range of load volumes generally involved.

Figure 4:
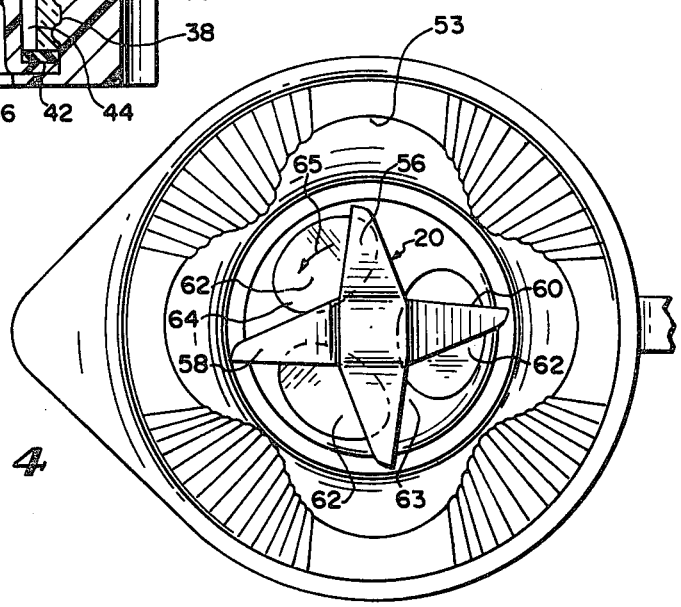
FIG. 4 is a top plan view of the jar with the top removed.

Cutters 20 rotatably journaled in the base 22 of the assembled container 12 are rotated counterclockwise as viewed from above (FIG. 4) when in place on the power unit 14 and a removable cover 24 is provided at the top to confine mixture in the container 12 and having an axial wall 45 to redirect movement of the ingredients to the center and downwardly of the container.

The jar 12 as sectionally illustrated in FIG. 3 is a knock-down assembly of parts for cleaning purposes. It has a transparent central container portion 26 having a handle 27 and is enlarged at the upper end with a lip 28 for pouring. It tapers downwardly towards a cylindrical bottom opening 30 where it is terminally reduced and externally provided with a coarse male thread at 32. A cutter unit 34 having a retaining flange 40 is received against the lower end with a resilient washer 42 between them as releasably secured in sealed relation by a collar 36. The collar in turn has a coarse female thread at 38 engaging the thread 32 and the pitch of the coarse threads enables the threads to engage each other and establish a sealed relation in approximately one-half turn. The collar 36 is externally fluted at 41 to be supported against rotation on the base 22.

It is desirable to have the housing 12 removable from the base for cleaning purposes with the cutter supporting pedestal 50 large enough at its base (FIG. 3) to provide minimized clearance space at 44 between it and the reduced bottom end 30 of the removable jar 12 to assist in preventing any collection of food particles there which might burden mixture circulation flow rate in the jar. The direction and speed of cutter-induced flow accelerates the flow that moves small and minutes objects through and out of the space 44, and carries larger food objects at high velocity past the space 44 and repeatedly through the cutter paths for comminution.

More particularly, the cutter unit 20 includes the shaped pedestal element 50 which supports a sleeve bearing 52 that journals the cutter drive shaft 54. The shaft has a driven spider 56 on the lower end and a cruciform cutter 20 on the upper end, the latter preferably being made of two elements 56 and 58 bevel-sharpened on their lower faces at their leading edges 60 to direct several material radially inwardly as indicated by the broken line arrow in FIG. 3 and then directed back through the blades 20 by the downstream convergence and narrowing clearance between the trailing edge 64 of recess 62 and the path of the cutting blades 58.

For the purposes of understanding the high rate of positive circulation and comminution, each blade is formed with its cutting edge 60 parallel to but ahead of a radial line and also is pitched in the direction of rotation 65 to provide a downward propulsion and a swirling of liquid in the jar. As indicated in phantom line 61 the two upper blades 56 are tilted upwardly at approximately 45° to provide central cavitation of the jar and an outward and downward propulsion of liquid therefrom into the flutes 53 of the jar against their bottom end walls 63 for a positively driven upward movement in the flutes to circulate the contents in the jar while bringing fresh material, and particularly solid particles, into proximity to the conical pedestal surface. Here the axially pitched lower blades 58 are inclined downwardly and outwardly at approximately 45° with an inclination to provide an inward movement of liquid which can be referred to as down-and-in towards and through the lower cutters 58. The lower edge of the conical surface is disposed below the upper rounded inner edge of the cylindrical inner wall of the flange on the jar when assembled to dispose the tips of the lower cutters 58 at approximately the level of the lower ends of the four vertical flutes 53 in the side walls of the jar.

The conical wall on the pedestal is horizontally recessed at 62 at circumferentially spaced points to provide horizontally disposed approximately cylindrical surface portions of revolution of 90° which are substantially vertical at their top edges 70 and horizontal at their lower edges 72. The agitated liquid has a circular and a down-and-in movement from the cutters 58 that is smoothly redirected by the recesses 62 in an outwardly direction at their radially shallow downstream edges 64. This provides agitation in the narrow small area 44 between the pedestal and cylindrical jar surface at the bottom of the jar to keep it flowing with the redirected flowing liquid as propelled to enter the vertical flutes 53 of the jar and circulate larger solid portions in the jar quickly up the sides of the jar and back through the cutter blades for a nondelaying repeated action that is substantially independent of the initial sizes of the solids being comminuted in the liquefied and aerated mixture at different selected speeds.

The down-and-out blades 56 operate initially to reduce large particles rapidly while the down-and-in blades 58 comminute solids with a rapid radial flow of mixture that is substantially uninterrupted with respect to a timed cycle. The tapered wall portions 63 between the recesses 62 greatly dampen any circulatory movement of mixture induced by the cutters and thereby augment the radial movement.

Compositely, the cutters 56 and 58 also aspirate downwardly liquid from the center of the jar to develop a column of air extending to the cutters. In doing this, the cutters develop a vortex and drive the aspirated liquid up the flutes 53 of the jar to carry liquid circulation to the top of the jar and establish a determined liquid flow path down the center and up the sides of the jars.

Preferably, the cover 24 for the container has a downwardly opening annular space 46 at the top of the jar and an axial flange 48 with circular radial sealing flanges 50 which receive or are engaged by the mix rising on the side walls. They redirect a swirling mix inwardly where it engages a central flange 45 carrying a detachable ingredient measuring cup 51 and direct flow downwardly for return by gravity to the cutters 20 for further comminution of solid particles in the mixture as described. Also, where solids are hydraulically and pneumatically forced to pass in and out of recesses 62 across the path of cutter movement as at trailing stationary edges 64, the constancy of cutter action is related to the constancy of mixture flow.

Accordingly, where everything must pass through the cutters 56 and 58 each time around, the dominant variable factor is the excursion distance from the cutters up the wall of the jar and back down its center, with the effect of gravity being a constant and the cutter speed being substantially the same under load variations within this range. The cutters in the present invention propel and cavitate all volumes of liquid that are one cup or greater, in a jar capable of handling five cups where the depth of two cups is approximately the mean inside diameter of the fluted jar, and, the cutter diameter closely approaches the minimum diameter at the bottom of the jar.

Therefore, solids that may be present in the mixture in both instances circulate approximately the same distance and number of times to and from the cutters 56 and 58 in a timed cycle.

The measuring cup 51 is mounted in the cap 24 with a bayonet joint having two teeth 70 received through grooves 72 to lock under inclined cam edges on the inner circular track of the sleeve portion 74. This measuring cup 51 can be removed during a timed liquefying operation to add measured ingredients when desired without permitting any liquid mix to escape during a mixing operation. The sleeve portion 74 redirects centrally and downwardly the mixture driven upwardly on the side walls in its flow path of movement.

What is claimed is:

1. A liquefier having an upwardly open jar defining a central space that is open throughout its length and bounded by circularly spaced radially recessed side wall portions disposed above a mounting base portion to define contiguous vortexing portions;
    bottom closure means releasably secured to said mounting base portion and including two pairs of radially extending cutter blades;
    one pair extending upwardly and outwardly at approximately a 45° angle rotatably supported in said central space, and
    the other pair extending downward-and-out with their tips at approximately the lower ends of said recessed side wall portions,
    said blades being pitched for impulsion of liquid material in the jar in a downward direction when rotated;
    means for journaling the blades for rotation about a vertical axis including a pillar supporting the blades above the lower ends of said recessed side walls and having a plurality of circumferentially spaced recesses of varying radial depths normal to said axis and opening radially outwardly, said recesses being of a radial depth less at their circumferentially adjacent ends than at their central portions intermediate their ends.

2. The liquefier defined in claim 1 in which said recessed side walls are four in number while said spaced outwardly opening recesses are three in number.

3. The liquefier defined in claim 1 in which said recesses define substantially cylindrical surfaces with their axes disposed horizontally.

4. The liquefier defined in claim 1 in which ingredients impelled downwardly and inwardly engage the upper upright radially directed portions of the surfaces of the recesses of varying radial depth normal to the axis of rotation and are progressively redirected radially outward for horizontal discharge into the lower ends of said recessed side walls in a radial direction across a narrow circular clearance between said pillar and mounting base portion coaxial with said central space.

5. A liquefier defined in claim 1 in which said wall has a conical shape and each recess comprises a cavity in the wall defining a surface of revolution having an axially directed horizontal portion transversely intersecting said conical wall.

6. The liquefier defined in claim 1 in which said recessed side walls are four in number while said spaced outwardly opening recesses are three in number.

7. A liquefier having a rotating prime mover and comprising:
- an elongated container jar disposed upright having fluted side walls cross-sectionally defining a cloverleaf shape with a reduced circular shoulder adjacent the lower ends of the flutes;
- a bottom element closing the lower end below said shoulder and having a central conical portion extending above said shoulder journaling a shaft driven by said prime mover;
- cutter means carried by said shaft having a lower cutting edge portion substantially following the contour of said conical portion and terminating in close proximity to said shoulder for driving liquid against the conical surface in one area;
- said conical portion having a plurality of circumferentially spaced recess means in said surface area of a depth varying circumferentially in a plane normal to the axis of the conical portion for redirecting liquid towards said shoulder; and
- said cutter means having another cutting edge portion for driving liquid from said recess means to said shoulder.

8. The combination of claim 7 in which said cutter means includes upwardly inclined cutters with leading cutting edges on upwardly diverging blade portions pitched to cavitate the area above them by positive impulsion of liquid in the container in downwardly diverging directions to force the liquid up the fluted side wall.

9. A liquefier comprising:
- a container for mixtures with solid ingredients therein;
- a conical wall member radially defining a plurality of radially open recesses of circumferentially varying depth in a direction perpendicular to its conical axis;
- a drive shaft journaled in said wall proximate said recesses including a cutting edge followed by a body portion pitched to drive liquid and solids circumferentially through said radial recesses.

10. A liquefier having an upwardly open jar defining a central space open throughout its length bounded by circularly spaced radially recessed side walls extending above a mounting base portion and defining contiguous vortexing sections;
- bottom closure means releasably secured to said mounting base portions rotatably supporting a cutter assembly supported on said mounting base portion and including two pairs of blades, one pair extending upwardly and outwardly at approximately a 45° angle supported in said central space and the other pair extending downward-and-out with their tips at approximately the lower ends of said recessed side walls;
- said blades being pitched for downward movement of liquid material in the jar when rotated;
- means for journaling the blades from rotation about a vertical axis including a pillar supporting the blades above the lower ends of said recessed side walls and having a plurality of circumferentially spaced recesses opening radially outwardly, said recesses being of a radial depth less at their circumferential ends than intermediate their ends.

* * * * *